US011142249B2

(12) United States Patent
Kawai et al.

(10) Patent No.: US 11,142,249 B2
(45) Date of Patent: Oct. 12, 2021

(54) SUBFRAME FOR VEHICLE

(71) Applicants: F-TECH INC., Kuki (JP); H-ONE Co., Ltd., Saitama (JP)

(72) Inventors: Toru Kawai, Tochigi (JP); Hisaharu Kato, Saitama (JP)

(73) Assignees: F-TECH INC., Kuki (JP); H-ONE CO., LTD., Saitama (JP)

(*) Notice: Subject to any disclaimer, the term of this patent is extended or adjusted under 35 U.S.C. 154(b) by 41 days.

(21) Appl. No.: 16/829,540

(22) Filed: Mar. 25, 2020

(65) Prior Publication Data

US 2020/0307704 A1    Oct. 1, 2020

(30) Foreign Application Priority Data

Mar. 29, 2019 (JP) .............................. JP2019-068082

(51) Int. Cl.
| | | |
|---|---|---|
| *B62D 21/15* | (2006.01) | |
| *B62D 25/08* | (2006.01) | |
| *B62D 21/03* | (2006.01) | |
| *B62D 21/11* | (2006.01) | |

(52) U.S. Cl.
CPC ............ *B62D 21/155* (2013.01); *B62D 21/03* (2013.01); *B62D 21/11* (2013.01); *B62D 25/085* (2013.01)

(58) Field of Classification Search
CPC ...... B62D 21/155; B62D 21/03; B62D 21/11; B62D 25/085
See application file for complete search history.

(56) References Cited

U.S. PATENT DOCUMENTS 5,372,216 A * 12/1994 Tsuji ................... B60G 99/00
                                                      180/274
6,722,696 B2 * 4/2004 Sonomura ............ B60K 5/1216
                                                      180/232
6,736,448 B2 * 5/2004 Hanakawa .......... B62D 21/152
                                                      296/187.09

(Continued)

FOREIGN PATENT DOCUMENTS

JP    H0391282 U  *  9/1991
JP    8-85473 A        4/1996

(Continued)

OTHER PUBLICATIONS

Office Action dated Jul. 6, 2021, issued in counterpart IN Application No. 202044013661, with English Translation. (7 pages).

*Primary Examiner* — Laura Freedman
(74) *Attorney, Agent, or Firm* — Westerman, Hattori, Daniels & Adrian, LLP

(57) ABSTRACT

A vehicle subframe includes: a front member that is arranged on a front side in a front-rear direction in a vehicle body, allows a driving source that generates a driving force for driving a vehicle to be mounted thereon, and has a front attachment portion to be attached at both ends in a width direction of the vehicle body on the front side; and a first side member and a second side member that extend in the front-rear direction, are arranged to be opposed to each other in the width direction of the vehicle body, are each connected to the front member, and each have a rear attachment portion to be attached to a portion on a rear side in the vehicle body in the front-rear direction.

6 Claims, 5 Drawing Sheets

(56) References Cited

U.S. PATENT DOCUMENTS

| | | | | |
|---|---|---|---|---|
| 6,843,524 B2 * | 1/2005 | Kitagawa | B62D 21/155 | 180/312 |
| 6,880,663 B2 * | 4/2005 | Fujiki | B62D 21/155 | 180/232 |
| 6,938,948 B1 * | 9/2005 | Cornell | B62D 21/152 | 296/187.09 |
| 7,669,688 B2 * | 3/2010 | Yamaguchi | B62D 21/155 | 180/312 |
| 8,267,429 B2 * | 9/2012 | Takeshita | B62D 21/11 | 280/784 |
| 8,480,102 B2 * | 7/2013 | Yamada | B62D 21/155 | 280/124.109 |
| 8,490,988 B2 * | 7/2013 | Takeshita | B62D 21/155 | 280/124.109 |
| 8,596,711 B2 * | 12/2013 | Yasui | B62D 25/082 | 296/187.09 |
| 8,672,393 B2 * | 3/2014 | Tomozawa | B62D 25/082 | 296/187.09 |
| 8,894,129 B2 * | 11/2014 | Katou | B62D 21/152 | 296/187.03 |
| 9,096,276 B2 * | 8/2015 | Komiya | B62D 21/155 | |
| 9,150,251 B2 * | 10/2015 | Ghislieri | B62D 21/152 | |
| 9,150,253 B2 * | 10/2015 | Watanabe | B62D 25/082 | |
| 9,216,767 B2 * | 12/2015 | Garnweidner | B62D 21/155 | |
| 9,254,872 B2 * | 2/2016 | Otani | B62D 21/155 | |
| 9,751,565 B2 * | 9/2017 | Tatsuwaki | B62D 21/11 | |
| 9,776,663 B1 * | 10/2017 | Craig | B62D 3/00 | |
| 9,902,428 B2 * | 2/2018 | Murata | B62D 21/155 | |
| 10,654,525 B2 * | 5/2020 | Komiya | B62D 21/11 | |
| 11,027,618 B2 * | 6/2021 | Kamikihara | B60K 1/04 | |
| 11,027,779 B2 * | 6/2021 | Takakuwa | B62D 21/11 | |
| 2016/0194029 A1 | 7/2016 | Kramer et al. | | |
| 2016/0375938 A1 * | 12/2016 | Matsuo | B62D 29/008 | 296/204 |
| 2017/0050674 A1 | 2/2017 | Wolf-Monheim | | |
| 2017/0174265 A1 | 6/2017 | Maruyama et al. | | |
| 2020/0047811 A1 * | 2/2020 | Shimizu | B62D 25/082 | |
| 2020/0307698 A1 * | 10/2020 | Kawai | B62D 21/11 | |
| 2020/0307699 A1 * | 10/2020 | Takahashi | B62D 21/11 | |
| 2021/0024137 A1 * | 1/2021 | Okamoto | B62D 21/11 | |

FOREIGN PATENT DOCUMENTS

| | | | | |
|---|---|---|---|---|
| JP | 08156827 A | * | 6/1996 | B62D 1/197 |
| JP | 2003146242 A | * | 5/2003 | |
| JP | 2007216901 A | * | 8/2007 | |
| JP | 2008174179 A | * | 7/2008 | |
| JP | 2009-61879 A | | 3/2009 | |

* cited by examiner

SUBFRAME FOR VEHICLE

BACKGROUND OF THE INVENTION

The present invention relates to a vehicle subframe and particularly relates to a vehicle subframe that allows a driving source and the like to be mounted thereon, supports a suspension arm and the like, and is attached to a vehicle such as an automobile.

In recent years, various external-force application parts are attached to a subframe attached to a vehicle such as an automobile, which include mount-related parts for a power system, for example, an internal combustion engine and an electric motor, suspension-related parts such as a suspension arm and a stabilizer, and steering-related parts such as a steering gear box.

Therefore, the subframe is expected to be attached to the body of the vehicle in a form in which the strength and rigidity thereof are increased while the productivity and the like are improved.

Furthermore, the subframe is expected to be deformed in a desired deformation mode, that is, to exhibit a required collision performance typically in frontal collision of the vehicle to which the subframe is attached, in order to absorb a portion of a kinetic energy applied to the vehicle in the collision.

Under such a circumstance, Japanese Utility Model Laid-open Publication No. H3-91282 relates to a front subframe 16 and discloses a configuration in which the front subframe 16 is assembled in a form of a frame by side rails 18 arranged along front side members 12 and a cross member 20 arranged between a front cross member 14 and the front side members 12, and a projection 24 is provided at an end of each side rail 18 on a vehicle-front side. In the front subframe 16, an energy from forward of a vehicle is input to a vehicle body while being distributed to a front end of the front side member 12 and a front end of the projection 24, the energy input to the front side member 12 is attenuated by an axial compressive force of the front side member 12 itself and is also transmitted to the front subframe 16 via a bracket 22 on the vehicle-front side as a bending moment around a fixing point of the front subframe 16, and the energy input to the projection 24 is attenuated by axial compression of the projection 24 itself and is then transmitted to the front subframe 16 as an axial compressive force.

Japanese Patent Application Laid-open No. H8-85473 relates to a subframe structure of an automobile and discloses a configuration in which a longitudinal member 6, extending in a front-rear direction of a vehicle body, of a subframe 4 provided in a front portion of the automobile to form parallel crosses is formed to be bent in such a manner that an intermediate portion 6c is located below front and rear ends 6a and 6b, and the longitudinal member 6 is fastened to the vehicle body at three portions including an intermediate coupling bracket 9 arranged to stand on the intermediate portion and the front and rear ends 6a and 6b. Further, groove-shaped beads 10a and 10b for bending, substantially perpendicular to an axis-line direction, are provided between the front end 6a of the longitudinal member 6 and the intermediate coupling bracket 9 at positions in upper and lower surfaces different from each other in the axis-line direction.

Furthermore, Japanese Patent Application Laid-open No. 2009-61879 relates to a front subframe structure and discloses a configuration that is formed by side members 2L and 2R extending in a front-rear direction of a vehicle body, to which a pair of left and right suspensions are attached, and a cross member 3 installed between the left and right side members 2L and 2R. In the configuration, the left and right side members 2L and 2R that have a doglegged shape and are bent inwardly are formed to be substantially symmetrical with each other. The cross member 3 couples bent portions 2Lc and 2Rc of the left and side members 2L and 2R to each other. A fragile portion 4 is formed in the cross member 3.

SUMMARY OF THE INVENTION

However, the studies of the present inventor have revealed that, although the configuration in Japanese Utility Model Laid-open Publication No. H3-91282 is directed to absorbing an energy from forward of a vehicle by axial compression along the front-rear direction of the vehicle via a projection and then absorbing the energy by axial compression of a front subframe, this publication fails to disclose or suggest absorbing the energy by using a bending moment applied to the front subframe. Therefore, the configuration in this publication still has room for improvement from a viewpoint of increasing absorption of the energy.

Further, although Japanese Patent Application Laid-open Nos. H8-85473 and 2009-61879 disclose absorbing an energy by using a bending moment applied to a subframe, but fail to disclose or suggest absorbing the energy by using axial compression of the subframe.

Therefore, the configurations in these publications still have room for improvement from the viewpoint of increasing absorption of the energy.

The present invention has been made as a result of the above studies and it is an object of the present invention to provide a vehicle subframe capable of exhibiting a required collision performance by combining crush deformation in which the amount of energy absorption in deformation is large and bending deformation in which the flexibility of deformation is high with each other, while improving the strength and the rigidity.

In order to achieve the above object, a first aspect of the present invention provides a vehicle subframe attached to a vehicle body of a vehicle, comprising: a front member that is arranged on a front side in a front-rear direction in the vehicle body, allows a driving source that generates a driving force for driving the vehicle to be mounted thereon, and has a front attachment portion to be attached at both ends in a width direction of the vehicle body on the front side; and a first side member and a second side member that extend in the front-rear direction, are arranged to be opposed to each other in the width direction of the vehicle body, are each connected to the front member, and each have a rear attachment portion to be attached to a portion on a rear side in the vehicle body in the front-rear direction, wherein the first side member and the second side member each have a crushable portion in which crush deformation is caused to occur in the front-rear direction by a load applied thereto via the front member in frontal collision of the vehicle, and a bendable portion in which bending deformation is caused to occur in a direction crossing the front-rear direction by the load, arranged in series.

According to a second aspect of the present invent ion, in addition to the first aspect, the first side member and the second side member each have fragile portions for the load, in each of the first side member and the second side member, the rear attachment portion is arranged in a widened portion having a width that gradually increases in the width direction to the rear side, and the crushable portion is arranged on the rear side of the bendable portion, and the crush deformation is able to start at a portion of the widened portion at which widening of the width starts, as a first fragile portion in the fragile portions for the load.

According to a third aspect of the present invention, in addition to the second aspect, in each of the first side member and the second side member, a portion in the crushable portion is arranged as a second fragile portion in the fragile portions, the portion being adjacent to the first fragile portion on the front side of the first fragile portion and having a sectional area of a longitudinal section of each of the first side member and the second side member taken along a plane perpendicular to the front-rear direction, which is obtained by reducing that of a general portion other than the fragile portions and the widened portion on both sides in a vertical direction of the vehicle body, and a portion in the bendable portion is arranged as a third fragile portion in the fragile portions, the portion having the sectional area of the longitudinal section of each of the first side member and the second side member, which is obtained by reducing that of the general portion on one side in the vertical direction.

According to a fourth aspect of the present invention, in addition to the second or third aspect, in each of the first side member and the second side member, a supporting portion that supports a suspension member of the vehicle is arranged between the crushable portion and the bendable portion.

According to a fifth aspect of the present invention, in addition to any one of the first to fourth aspects, each of the first side member and the second side member includes an upper member that has a pair of upper longitudinal wall portions opposed to each other in the width direction and an upper wall portion connecting the pair of upper longitudinal wall portions to each other, and a lower member that is arranged below the upper member in a vertical direction of the vehicle body and has a pair of lower longitudinal wall portions opposed to each other in the width direction and a lower wall portion connecting the pair of lower longitudinal wall portions to each other, and the pair of upper longitudinal wall portions and the pair of lower longitudinal wall portions are welded in overlapped portions thereof to correspond to each other.

According to a sixth aspect of the present invention, in addition to the fifth aspect, the upper member includes upper inclined wall portions between the pair of upper longitudinal wall portions and the upper wall portion to connect the pair of upper longitudinal wall portions and the upper wall portion to each other, and the lower member includes lower inclined wall portions between the pair of lower longitudinal wall portions and the lower wall portion to connect the pair of lower longitudinal wall portions and the lower wall portion to each other.

In the configuration according to the first aspect of the present invention, a vehicle subframe attached to a vehicle body of a vehicle, includes a front member arranged on a front side in a front-rear direction in the vehicle body, allows a driving source that generates a driving force for driving the vehicle to be mounted thereon, and has a front attachment portion to be attached to both ends in a width direction of the vehicle body on the front side, and a first side member and a second side member that extend in the front-rear direction, are arranged to be opposed to each other in the width direction of the vehicle body, are each connected to the front member, and each have a rear attachment portion to be attached to a portion on a rear side in the front-rear direction in the vehicle body. The first side member and the second side member each have a crushable portion in which crush deformation is caused to occur in the front-rear direction by a load applied thereto via the front member in frontal collision of the vehicle and a bendable portion in which bending deformation is caused to occur in a direction crossing the front-rear direction by the load, arranged in series in the front-rear direction. Therefore, while the strength and the rigidity of the entire vehicle subframe are improved, it is possible to transmit an impact (the load) applied typically in frontal collision of the vehicle to the first and second side members at a time in a distributed manner via the front member that is more hardly deformed than the first and second side members, and combine crush deformation in which the amount of energy absorption in deformation is large and bending deformation in which the flexibility of deformation is high in the first and second side members in which a stroke of crush deformation (the amount of deformation in a crush direction) can be easily made large and in which the flexibility of bending deformation can be easily arranged to be high, so that a required collision performance can be exhibited.

In the configuration according to the second aspect of the present invention, the first side member and the second side member each have fragile portions for the load in frontal collision. In each of the first side member and the second side member, the rear attachment portion is arranged in a widened portion having a width that gradually increases in the width direction to the rear side, the crushable portion is arranged on the rear side of the bendable portion, and crush deformation is able to start at a portion in the widened portion at which widening starts as a first fragile portion of the fragile portions for the load in frontal collision.

Therefore, it is possible to surely cause crush deformation to start while portions of attaching the vehicle subframe to the vehicle body are ensured and the crushable portion is ensured at the same time.

In the configuration according to the third aspect of the present invention, in each of the first side member and the second side member, a portion in the crushable portion is arranged as a second fragile portion in the fragile portions, the portion being adjacent to the first fragile portion on the front side of the first fragile portion and having a sectional area of a longitudinal section of each of the first side member and the second side member taken along a plane perpendicular to the front-rear direction, which is obtained by reducing that of a general portion other than the fragile portions and the widened portion on both sides in a vertical direction of the vehicle body. Also, in the bendable portion, a portion is arranged as the third fragile portion in the fragile portions, the portion having a sectional area of the longitudinal section of each of the first side member and the second side member, which is obtained by reducing that of the general portion on one side in the vertical direction. Therefore, crush deformation starting in the first fragile portion can be taken over by the second fragile portion and caused to be continued as continuous crush deformation, and bending deformation can be started in a state where crush deformation has been substantially completed.

In the configuration according to the fourth aspect of the present invention, in each of the first side member and the second side member, a supporting portion that supports a suspension member of the vehicle is arranged between the crushable portion and the bendable portion. Therefore, while functions of crush deformation and bending deformation are surely exhibited, it is possible to support the suspension member at an appropriate supporting portion and ensure the crushable portion and the bendable portion and the supporting portion that supports the suspension member at the same time.

In the configuration according to the fifth aspect of the present invention, each of the first side member and the second side member includes an upper member having a pair of upper longitudinal wall portions opposed to each other in the width direction and an upper wall portion connecting the pair of upper longitudinal wall portions to each other, and a lower member arranged below the upper member in a vertical direction of the vehicle body and having a pair of lower longitudinal wall portions opposed to each other in the width direction and a lower wall portion connecting the pair of lower longitudinal wall portions to each other. The pair of upper longitudinal wall portions and the pair of lower longitudinal wall portions are welded to each other in overlapped portions thereof to correspond to each other. Therefore, it is possible to appropriately weld each of the first side member and the second side member while the functions of crush deformation and bending deformation are exhibited.

In the configuration according to the sixth aspect of the present invention, the upper member has upper inclined wall portions between the pair of upper longitudinal wall portions and the upper wall portion to connect them to each other, and the lower member has lower inclined wall portions between the pair of lower longitudinal wall portions and the lower wall portion to connect them to each other. Therefore, it is possible to improve the shape accuracy of each of the first side member and the second side member after formation and to surely allow the functions of crush deformation and bending deformation to be exhibited.

DETAILED DESCRIPTION OF THE PREFERRED EMBODIMENT

Figure 1:
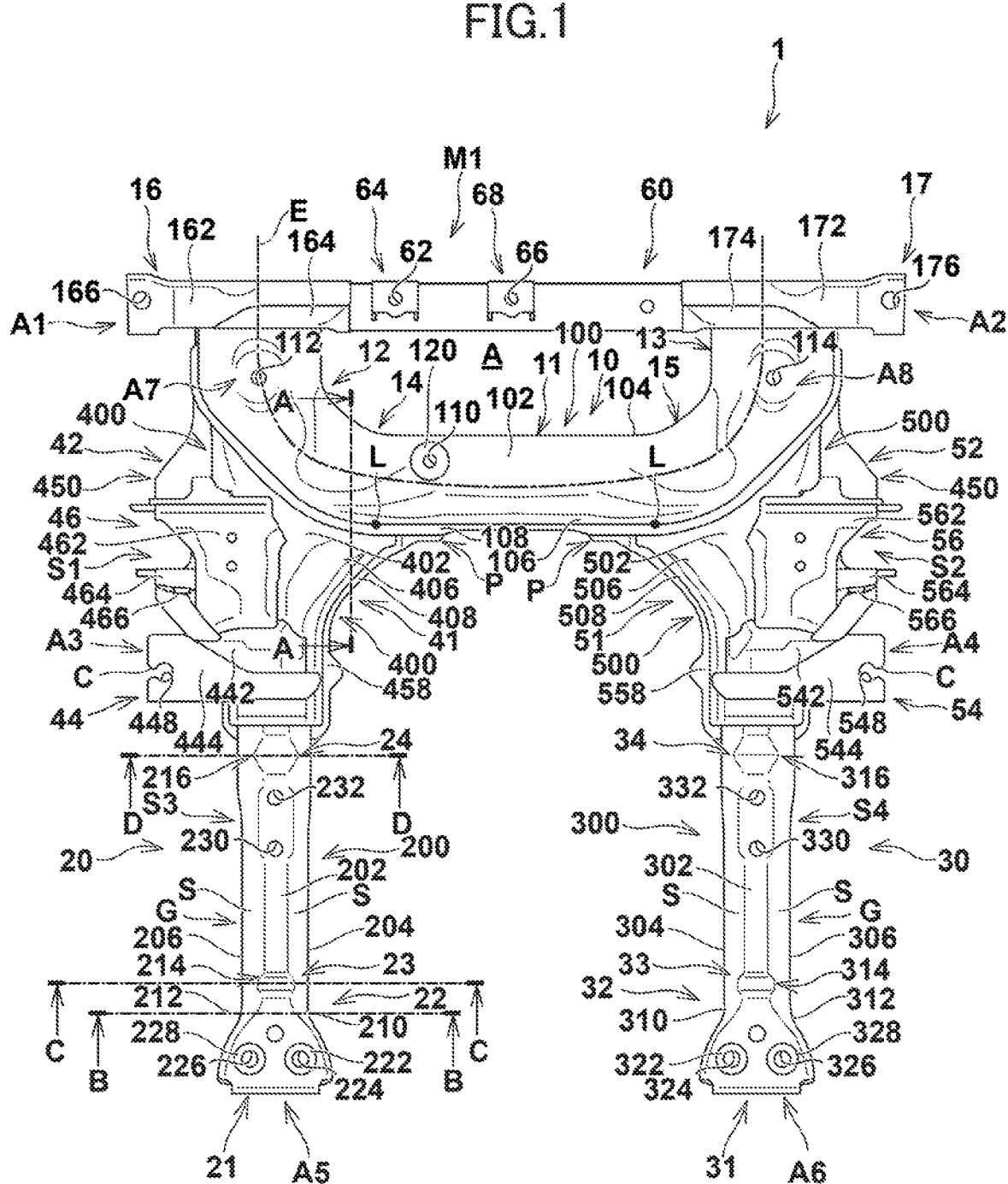
FIG. 1 is a plan view showing a configuration of a vehicle subframe according to an embodiment of the present invention.

A vehicle subframe according to an embodiment of the present invention will be explained below in detail with reference to FIGS. 1 to 7. In the drawings, an x-axis, a y-axis, and a z-axis form a triaxial orthogonal coordinate system, and descriptions are made assuming the positive direction of the x-axis as a right direction, the positive direction of the y-axis as a front direction, and the positive direction of the z-axis as an upper direction. An x-axis direction is referred to as a width direction or a lateral direction, a y-axis direction is referred to as a front-rear direction, and a z-axis direction is referred to as a vertical direction in some cases.

Figure 2:
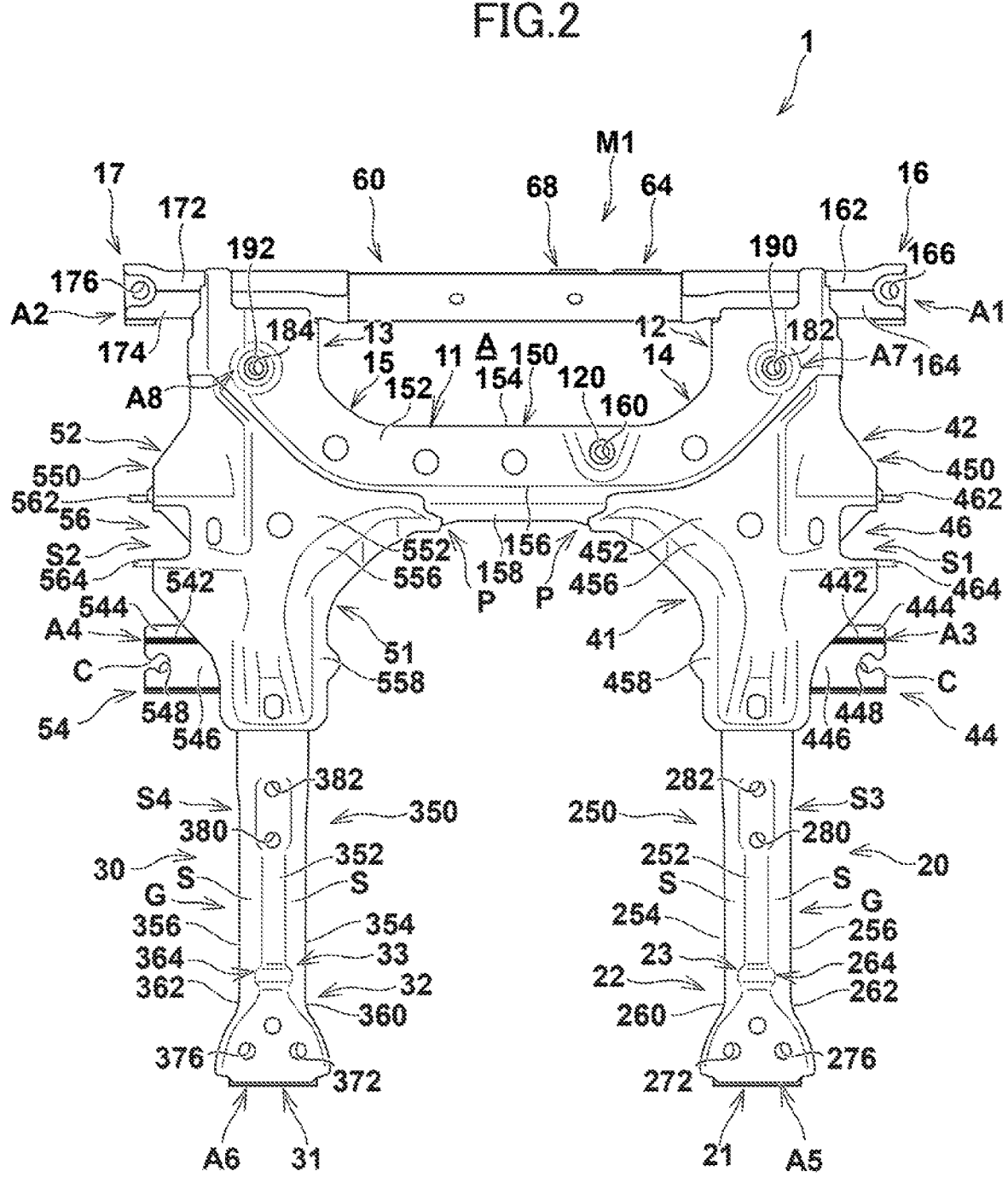
FIG. 2 is a bottom view showing the configuration of the vehicle subframe according to the embodiment.
Figure 2:
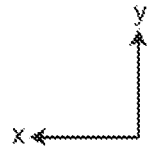
Figure 3:
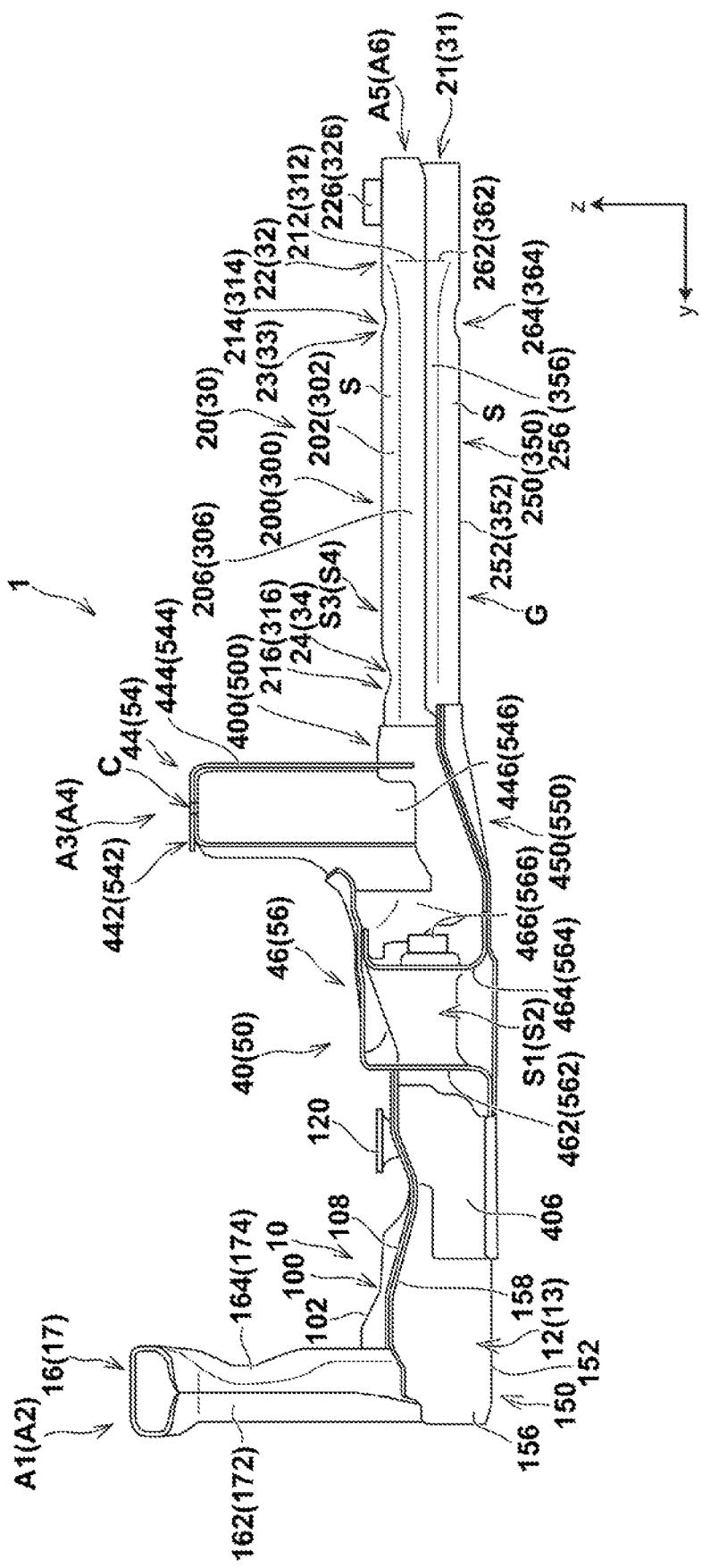
FIG. 3 is a left side view showing the configuration of the vehicle subframe according to the embodiment.
Figure 4:
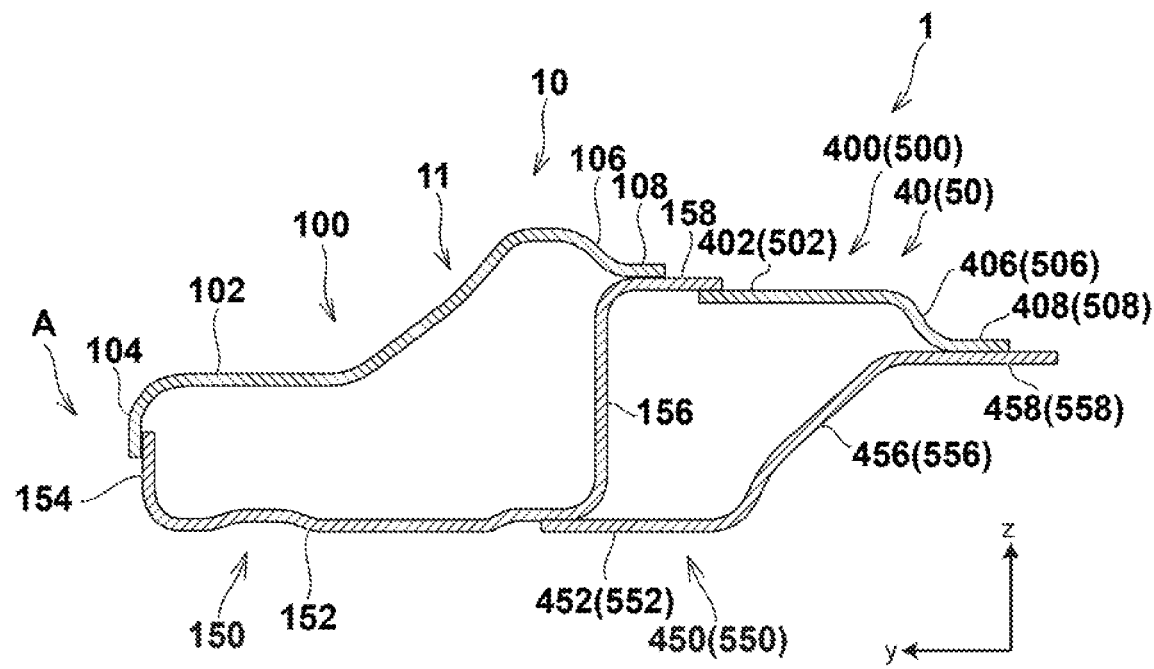
FIG. 4 is a cross-sectional view taken along a line A-A in FIG. 1.

FIGS. 1 to 3 are a plan view, a bottom view, and a left side view showing a configuration of a vehicle subframe according to the present embodiment, respectively. FIG. 4 is a cross-sectional view taken along a line A-A in FIG. 1, and is a longitudinal cross-sectional view taken along a plane parallel to a y-z plane formed by the y-axis and the z-axis.

Figure 5:
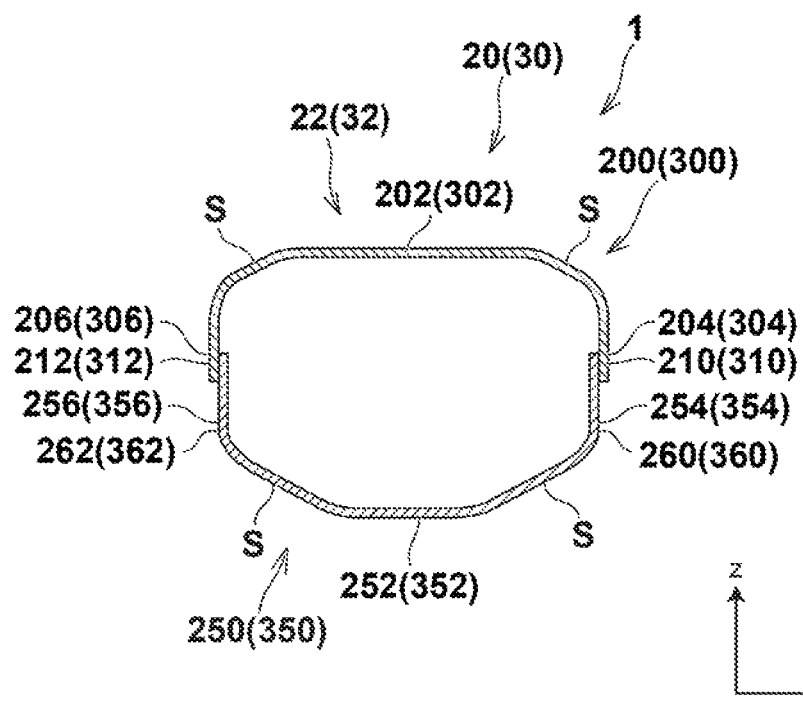
FIG. 5 is a cross-sectional view taken along a line B-B in FIG. 1.
Figure 6:
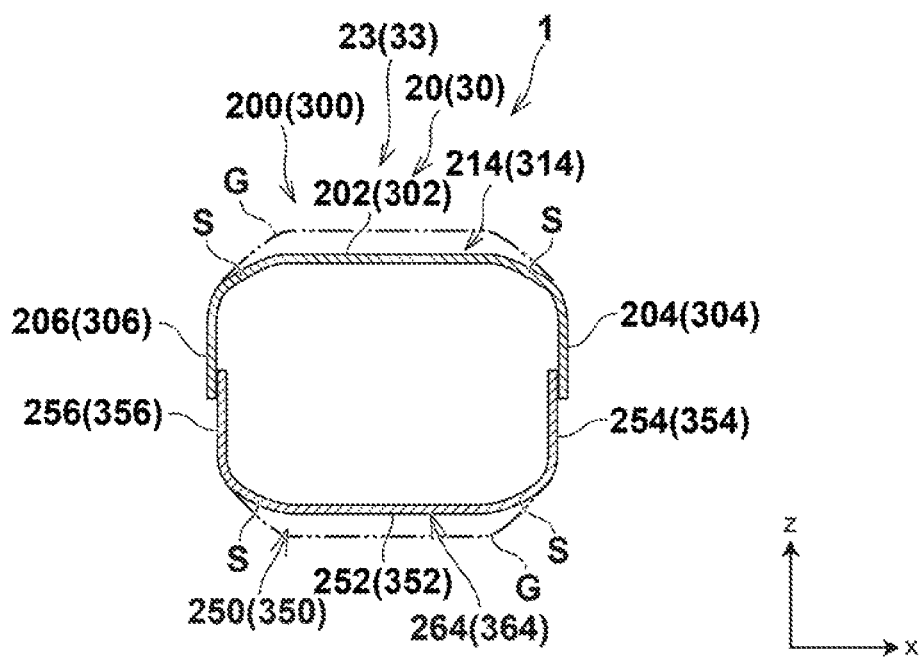
FIG. 6 is a cross-sectional view taken along a line C-C in FIG. 1.
Figure 7:
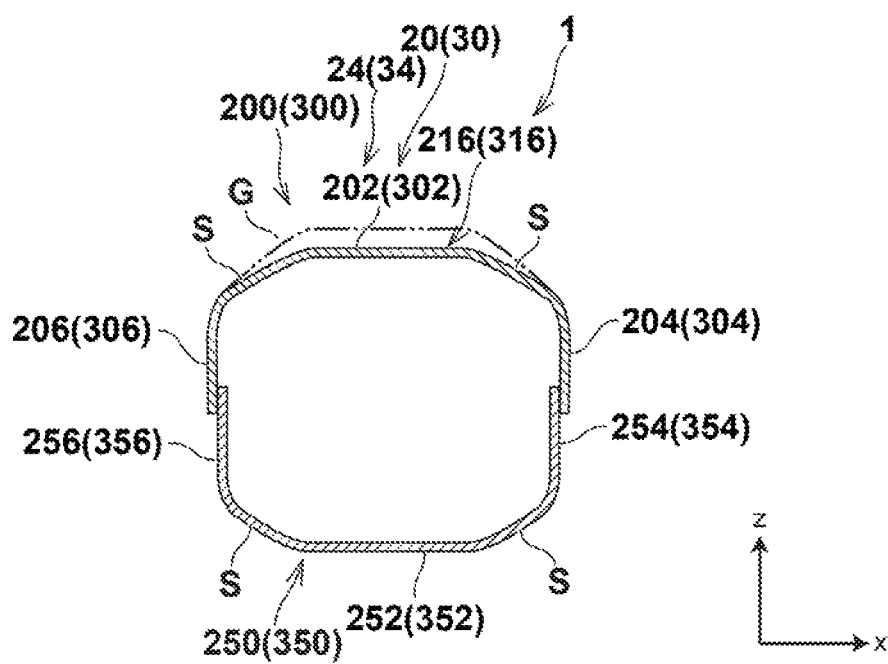
FIG. 7 is a cross-sectional view taken along a line D-D in FIG. 1.

FIGS. 5 to 7 are cross-sectional views respectively taken along a line B-B, a line C-C, and a line D-D in FIG. 1, and are longitudinal cross-sectional views taken along planes parallel to an x-z plane formed by the x-axis and the z-axis. In FIGS. 3 to 7, a part of reference signs for constituent elements in a right-side portion of the vehicle subframe is written in parentheses together with a reference sign for a constituent element in a left-side portion as necessary, for convenience of description.

As shown in FIGS. 1 to 7, a subframe 1 is attached to a vehicle body such as a front side frame that defines a front bay of a vehicle such as an automobile, allows a driving source, which is typically an electric motor, for generating a driving force applied to driving wheels of the vehicle to be mounted thereon, and supports a suspension arm and the like, although illustrations are omitted. This sub frame 1 typically has a symmetrical (plane-symmetrical) configuration with respect to a plane that is parallel to a y-z plane and passes through a center line extending in a front-rear direction in the center in a width direction of the vehicle body.

In the subframe 1, six portions including a first vehicle-body attachment portion A1, a second vehicle-body attachment portion A2, a third vehicle-body attachment portion A3, a fourth vehicle-body attachment portion A4, a fifth vehicle-body attachment portion A5, and a sixth vehicle-body attachment portion A6 are arranged as portions attached to the vehicle body, four supporting portions including a first supporting portion S1, a second supporting portion S2, a third supporting portion S3, and a fourth supporting portion S4 are arranged as portions that support the suspension arm, and a driving-source supporting portion M1 is arranged as a portion that supports the driving source.

Further, attachment portions that allow various external-force application parts to be attached are arranged in the subframe 1.

Examples of those attachment portions are a steering-gear-box left attachment portion A7, a steering-gear-box right attachment portion A8, and a stabilizer attachment portion (not shown), details of which will be described later.

Specifically, the subframe 1 mainly includes a cross member 10, a pair of side members including a left side member 20 and a right side member 30, a left coupling member 40, a right coupling member 50, and a front coupling member 60. The cross member 10 is arranged to extend in the width direction and includes left and right extending portions that extend in the front-rear direction.

The left side member 20 and the right side member 30 are arranged on the rear side of the cross member 10, extend in the front-rear direction, and are arranged to be opposed to each other in the width direction. The left coupling member 40 is arranged between the cross member 10 and the left side member 20 and couples them to each other.

The right coupling member 50 is arranged between the cross member 10 and the right side member 30 and couples them to each other. The front coupling member 60 is arranged on the front side of the cross member 10 and couples the left and right extending portions of the cross member 10 to each other. These members are each typically obtained by shaping a flat-plate member such as a steel plate, or a cylindrical member made of steel or the like. Overlapped portions or butted portions are welded by arc welding or the like to be integrated with each other while being in contact with each other correspondingly, so that the subframe 1 has a closed-sect ion shape basically. Further, the cross member 10, the left coupling member 40, the right coupling member 50, and the front coupling member 60 may be collectively referred to as front members. It is possible that the cross member 10 and the left and right coupling members 40 and 50 are not obtained by integrating separate members prepared in advance with each other by arc welding or the like in a state where those correspond to each other. Alternatively, two press-formed products that are upper and lower products forming one pair may be integrated with each other by being welded by arc welding or the like, or those members may be manufactured by casting a metal material or the like. Further, the front coupling member 60 may be omitted if it is not required from a viewpoint of a part layout, the strength, or the like.

In detail, the cross member 10 has a lateral portion 11 that extends in the width direction, a left front portion 12 that is located on the left front side of the lateral portion 11 and extends in the front-rear direction, a right front portion 13 that is located on the right front side of the lateral portion 11 and extends in the front-rear direction, a left connecting portion 14 that connects a left end of the lateral portion 11 and a rear end of the left front portion 12 to each other with a smoothly curved shape, and a right connecting portion 15 that connects a right end of the lateral portion 11 and a rear end of the right front portion 13 to each other with a smoothly curved shape. That is, the cross member 10 is a member that is convex toward the rear in a top view, defines an extending direction E that extends between a front end of the left front portion 12 and a front end of the right front portion 13 while being curved via the left connecting portion 14, the lateral portion 11, and the right connecting portion 15, and defines an inner region A surrounded by these portions. A driving source may be accommodated in this inner region A, or in the inner region A and a portion of a region on the rear side of the lateral portion 11 to be arranged over those regions. Further, an impact applied to a front end of the subframe 1 in frontal collision of a vehicle is distributed and transmitted to the lateral portion 11 and the left and right coupling members 40 and 50 via the left front portion 12 and/or the right front portion 13, and is then transmitted to the left and right side members 20 and 30 as front-rear direction components. Furthermore, a fragile portion that can be deformed by this impact is arranged in each of the left and right side members 20 and 30, but is not arranged in other members, that is, the cross member 10, the left coupling member 40, the right coupling member 50, and the front coupling member 60.

A left front attachment member 16 for attaching the subframe 1 to a front end of a left side frame of a vehicle body is arranged in the front end of the left front portion 12 of the cross member 10 and is connected thereto in a form of basically projecting to upper left. The left front attachment member 16 has a front-side member 162 and a rear-side member 164 arranged on the rear side of the front-side member 162. The front-side member 162 has a through hole 166 that vertically penetrates therethrough. Similarly, aright front attachment member 17 for attaching the subframe 1 to a front end of a right side frame of the vehicle body is arranged in the front end of the right front portion 13 of the cross member 10 in a form of basically projecting to upper right. The configuration related to the right front attachment member 17 is symmetrical with the configuration related to the left front attachment member 16 with respect to a plane that is parallel to a y-z plane and passes through the center line extending in the front-rear direction in the center in the width direction of the vehicle body, and therefore the detailed descriptions thereof are omitted. The right front attachment member 17 has a front-side member 172, a rear-side member 174, and a through hole 176 that respectively correspond to the front-side member 162, the rear-side member 164, and the through hole 166 of the left front attachment member 16. These members are each typically obtained by press-forming of one flat-plate member such as a steel plate to have a closed section shape, and are integrated with each other by being welded by arc welding or the like to correspond to each other. Alternatively, these members may be formed from a single plate member such as one steel plate or a cylindrical member made of steel or the like, not from two separate plate members such as steel plates, or may be manufactured by casting a metal material or the like.

The cross member 10 having the lateral portion 11, the left front portion 12, the right front portion 13, the left connecting portion 14, and the right connecting port ion 15 is typically configured by an upper member 100 and a lower member 150 that are integrated with each other typically by being welded by arc welding or the like. The upper member 100 is a plate member such as a steel plate that extends in the extending direction E, is open on the front side of each of the left front portion 12 and the right front portion 13, and is convex upward as a whole. The lower member 150 is a plate member such as a steel plate that is arranged below the upper member 100 to be opposed thereto and extend in the extending direction E, and is convex downward as a whole, similarly to the upper member 100. The upper member 100 and the lower member 150 may be formed from a single cylindrical member made of steel or the like, not from two separate plate members such as steel plates, or may be manufactured by casting a metal material or the like at one time, as necessary.

The upper member 100 has an upper wall portion 102, an inner wall portion 104 that continues to the upper wall portion 102 on the inner region A side and extends downward or obliquely downward, and an outer wall portion 106 that is located on the opposite side to the inner region A to be opposed to the inner wall portion 104, continues to the upper wall portion 102, and extends downward or obliquely downward. The outer wall portion 106 is provided with an outer flange 108 that extends from a lower end of the outer wall portion 106 toward the opposite side to the inner region A. A base member 120 is arranged on the upper wall portion 102 in the lateral portion 11, which has a through hole 110 formed therein coaxially with a through hole (not shown) that vertically penetrates through the upper wall portion 102. The upper wall portion 102 in the left front portion 12 has a through hole 112 formed to penetrate therethrough vertically. The upper wall portion 102 in the right front portion 13 has a through hole 114 formed to penetrate therethrough vertically.

Further, an R stop portion (an R stop line) that is the rightmost portion of a bending curve R forming at least a portion between the outer wall portion 106 in the lateral portion 11 and the outer wall portion 106 in the left connecting portion 14 and an R stop portion (an R stop line) that is the leftmost portion of a bending curve R forming at least a portion between the outer wall portion 106 in the lateral portion 11 and the outer wall portion 106 in the right connecting portion 15 are each denoted with a numeral L in FIG. 1.

The lower member 150 has a lower wall portion 152, an inner wall portion 154 that continues to the lower wall portion 152 on the inner region A side and extends upward or obliquely upward, an outer wall portion 156 that is located on the opposite side to the inner region A to be opposed to the inner wall portion 154, continues to the inner wall portion 154, and extends upward or obliquely upward, and an outer flange 158 that extends from an upper end of the outer wall portion 156 to the opposite side to the inner region A. In a top view, the inner wall portion 154 and the outer wall portion 156 have outer contour shapes that are identical to outer contour shapes of the inner wall portion 104 and the outer wall portion 106 of the upper member 100. In the lower wall portion 152 in the lateral portion 11, a through hole 160 is formed to penetrate therethrough vertically and to allow a lower end of the base member 120 to be inserted. A collar member 190 having a through hole 182 that is coaxial with the through hole 112 in the upper wall portion 102 is arranged on the lower wall portion 152 in the left front portion 12. A collar member 192 having a through hole 184 that is coaxial with the through hole 114 in the upper wall portion 102 is arranged on the lower wall portion 152 in the right front portion 13. Further, the upper member 100 and the lower member 150 are integrated with each other by being welded by arc welding or the like at ends of overlapped portions of the inner wall portion 104 and the inner wall portion 154 on the side close to the inner region A and at ends of overlapped portions of the outer flange 108 and the outer flange 158 on the opposite side to the inner region A, so that the upper and lower members 100 and 150 form a closed section that is open in the left front portion 12 and the right front portion 13 but is closed in other portions.

The left front attachment member 16 is in contact with a left front end of each of the upper wall portion 102, the inner wall portion 104, and the outer wall portion 106 of the upper member 100 and the lower wall portion 152, the inner wall portion 154, and the outer wall portion 156 of the lower member 150 while closing an opening on the left front side of a closed section defined by these wall portions, and is integrated with these portions with which the left front attachment member 16 is in contact by being welded typically by arc welding or the like while being placed on a portion of a front end of the lower wall portion 152 of the lower member 150. Thus, the left front attachment member 16 may be regarded as a portion of the cross member 10. Such an integrated configuration is also established similarly as to the right front attachment member 17 that is in contact with right front ends of these wall portions.

Further, the front coupling member 60 is typically configured by a cylindrical member made of steel or the like. A bracket 64 of steel or the like with a through hole 62 formed therein and a bracket 68 of steel or the like with a through hole 66 formed therein are arranged on an upper surface of the front coupling member 60.

The brackets 64 and 68 are welded to the upper surface of the front coupling member 60 by arc welding or the like and function as an attachment member for allowing a driving source to be accommodated in the inner region A defined by the subframe 1, for example, to be mounted on the subframe 1, together with the base member 120 arranged on the upper wall portion 102 in the lateral portion 11 of the cross member 10. A left end of the front coupling member 60 is welded by arc welding or the like while being nested in a right end of the left front attachment member 16, so that the left front attachment member 16 and the front coupling member 60 are integrated with each other. Such an integrated configuration is also established similarly as to the right front attachment member 17 having a left end into which a right end of the front coupling member 60 is nested. The left and right ends of the front coupling member 60 may correspond to the left front portion 12 and the right front portion 13 of the cross member 10, are connected thereto, and couple them to each other.

The left coupling member 40 defines an inner edge portion 41 that is a right edge in the width direction and has a front end portion at an inner front end portion P (shown in FIGS. 1 and 2), and an outer edge portion 42 that is a left edge in the width direction in such a manner that the length in the lateral direction (the width in the width direction) decreases from the front to the rear typically on the rear side of the cross member 10. The left coupling member 40 is configured by an upper member 400 and a lower member 450 integrated with each other by being welded typically by arc welding or the like, the upper member 400 being a plate member such as a steel plate, that is connected to a left rear end of the cross member 10, is open on both sides in the front-rear direction, and is convex upward as a whole, the lower member 450 being a plate member such as a steel plate, that is arranged below the upper member 400 to be opposed thereto and is convex downward as a whole, similarly to the upper member 400. The upper member 400 and the lower member 450 may be formed from a single plate member made of steel or the like, not from two separate plate members such as steel plates, or may be manufactured by casting a metal material or the like at once, as necessary.

The upper member 400 has an upper wall portion 402, an intermediate wall portion 406 that continues to the upper wall portion 402, extends obliquely downward, and extends to surround the upper wall portion 402 on both sides in the width direction and on the rear side, and a flange 408 that continues to a lower end of the intermediate wall portion 406, extends to the outside, and extends to surround the intermediate wall portion 406 on both sides in the width direction and on the rear side.

The lower member 450 has a lower wall portion 452, an intermediate wall portion 456 that continues to the lower wall portion 452, extends obliquely upward, and extends to surround the lower wall portion 452 on both sides in the width direction and on the rear side, and a flange 458 that continues to an upper end of the intermediate wall portion 456, extends to the outside, and extends to surround the intermediate wall portion 456 on both sides in the width direction and on the rear side.

The upper member 400 and the lower member 450 are integrated with each other by being welded by arc welding or the like at ends of overlapped portions of the flange 408 and the flange 458 except for the front ends and the rear ends of the upper and lower members 400 and 450, so that the upper and lower members 400 and 450 define a closed section that is open at the front and rear ends but is closed in other portions. Further, at the front ends of the upper and lower members 400 and 450, upper surfaces of each of the upper wall portion 402, the intermediate wall portion 406, and the flange 408 of the upper member 400 are welded to a lower surface of the outer flange 108 of the upper member 100 of the cross member 10 typically by arc welding or the like while being in contact therewith, and an upper surface of the lower wall portion 452 of the lower member 450 is welded to a lower surface of the lower wall portion 152 of the lower member 150 of the cross member 10 typically by arc welding or the like while being in contact therewith, so that the upper member 400 and the lower member 450 are integrated with the cross member 10 with the front and rear ends thereof closed.

A left intermediate attachment member 44 for attaching the subframe 1 to an intermediate portion of a left side frame of a vehicle body is arranged on the upper surface of the upper wall portion 402 and the upper surface of the intermediate wall portion 406 of the upper member 400 to be arranged over those upper surfaces and to basically project to upper left. The left intermediate attachment member 44 has a front inner member 442 and a rear inner member 444 arranged on the rear side of the front inner member 442.

The left intermediate attachment member 44 further has an outer member 446 arranged on the left side of the front inner member 442 and the rear inner member 444. A through hole 448 is formed in the rear inner member 444 and the outer member 446 to penetrate therethrough vertically. A peripheral portion on the left side of the through hole 448 is cut out, so that a cutout portion C is formed. These members are each typically obtained by press-forming of one flat-plate member such as a steel plate, and are integrated with each other by being welded by arc welding or the like to correspond to each other. Alternatively, these members may be formed from a single plate member such as one steel plate, not from three separate plate members such as steel plates, or may be manufactured by casting a metal material or the like, as necessary. The cutout portion C functions as a fragile portion for releasing a fastener such as a bolt inserted through the through hole 448 from the thorough hole 448 by an impact applied to a front end of the subframe 1 and transmitted to the cutout portion C in frontal collision of a vehicle.

On the front side of the left intermediate attachment member 44, a left front supporting member 46 that defines an opening for allowing a portion of a left suspension member (not shown) to be mounted therein is arranged on an upper surface of a portion of the flange 458 of the lower member 450, the portion projecting more to the left than the flange 408 of the upper member 400. The left front supporting member 46 has a front member 462 that configures a front wall portion and an upper wall portion of that opening and a rear member 464 that is arranged on the rear side of the front member 462 and configures a rear wall portion of that opening. The rear member 464 is provided with a nut 466, and a through hole (not shown) is formed in the front member 462 and the rear member 464 to correspond to the nut 466. These members are each typically obtained by press-forming of one flat-plate member such as a steel plate, and are integrated with each other by being welded by arc welding or the like to correspond to each other. Alternatively, these members may be formed from a single plate member such as one steel plate, not from two separate plate members such as steel plates, or may be manufactured by casting a metal material or the like, as necessary.

The configuration related to the right coupling member 50, a right intermediate attachment member 54, and a right front supporting member 56 is symmetrical with the configuration related to the left coupling member 40, the left intermediate attachment member 44, and the left front supporting member 46 with respect to a plane that is parallel to a y-z plane and passes through the center line extending in the front-rear direction in the center in the width direction of the vehicle body, and therefore the detailed descriptions thereof are omitted. The right coupling member 50, the right intermediate attachment member 54, and the right front supporting member 56 have an inner edge portion 51, an outer edge portion 52, an upper member 500, an upper wall portion 502, an intermediate wall portion 506, a flange 508, a lower member 550, a lower wall portion 552, an intermediate wall portion 556, a flange 558, a front inner member 542, a rear inner member 544, an outer member 546, a through hole 548, a cutout portion C of the through hole 548, a front member 562, a rear member 564, and a nut 566 that respectively correspond to the inner edge portion 41, the outer edge portion 42, the upper member 400, the upper wall portion 402, the intermediate wall portion 406, the flange 408, the lower member 450, the lower wall portion 452, the intermediate wall portion 456, the flange 458, the front inner member 442, the rear inner member 444, the outer member 446, the through hole 448, the cutout portion C of the through hole 448, the front member 462, the rear member 464, and the nut 466.

The left side member 20 typically has a crushable portion that is crushed and deformed in the front-rear direction by an impact that is applied to the front end of the subframe 1 and is transmitted to the left side member 20 in frontal collision of the vehicle, and a bendable portion that is bent and deformed by that impact in a direction crossing the front-rear direction, in the order from the rear to the front, and is connected at its front end to the left coupling member 40. The left side member 20 typically has a widened portion 21, a first fragile portion 22, a second fragile portion 23, and a third fragile portion 24 in that order from its rear end to the front. The widened portion 21 has a width that gradually increases to the rear to be larger than the width of a general portion G of the left side member 20, and is for attaching the subframe 1 to a rear end of a left side frame of a vehicle body or a front lower portion of a cabin. The first fragile portion 22 is a portion at which the width of the widened portion 21 starts to increase to the rear (a widening-start portion) and is a portion of start of crush deformation of the left side member 20 that is caused to occur in the front-rear direction by the front-rear direction component of the impact applied to the front end of the subframe 1 and transmitted to the left side member 20 in frontal collision of the vehicle. The second fragile member 23 is for causing crush deformation of the left side member 20 started by the first fragile portion 22 to occur continuously. The third fragile portion 24 is a portion of start of bending deformation of the left side member 20 that is caused to occur in the direction crossing the front-rear direction by the front-rear direction component of the impact applied to the front end of the subframe 1 and transmitted to the left side member 20 in frontal collision of the vehicle. A portion of the left side member 20, other than the widened portion 21, the first fragile portion 22, the second fragile portion 23, and the third fragile portion 24, is the general portion G that has a longitudinal section with a substantially constant area. From a viewpoint of surely receiving the impact applied to the front end of the subframe 1 and transmitted to the left side member 20 in frontal collision of the vehicle, it is preferable that, in the general portion G, an upper wall portion and a lower wall portion of the left side member 20 are parallel to an x-y plane and a left wall portion and a right wall portion of the left side member 20 are parallel to a y-z plane. From the viewpoint of surely receiving the impact applied to the front end of the subframe 1 and transmitted to the left side member 20 in frontal collision of the vehicle, it is preferable that the left side member 20 is in a range of the left front portion 12 in the cross member 10 in a front view. Further, from a viewpoint of achieving both a collision performance of the subframe 1 and the layout property of a suspension member, it is preferable that a supporting portion for allowing a portion of a left suspension member to be attached thereto is arranged between the second fragile portion 23 and the third fragile portion 24.

The left side member 20 is configured by an upper member 200 and a lower member 250 that are integrated by being welded typically by arc welding or the like. The upper member 200 is a plate member such as a steel plate that is open on both the front side and the back side and is convex upward as a whole. The lower member 250 is a plate member such as a steel plate that is arranged below the upper member 200 to be opposed thereto and is convex downward as a whole, similarly to the upper member 200. The upper member 200 and the lower member 250 may be formed from a single cylindrical member of steel or the like, not from two separate plate members such as steel plates, or may be manufactured by casting a metal material or the like at one time, as necessary.

The upper member 200 has an upper wall portion 202, an inner wall portion 204 that continues to the upper wall portion 202 on the right and hangs down from the upper wall portion 202, and an outer wall portion 206 that continues to the upper wall portion 202 on the left, hangs down from the upper wall portion 202, and is opposed to the inner wall portion 204 in the width direction.

The lower member 250 has a lower wall portion 252, an inner wall portion 254 that continues to the lower wall portion 252 on the right and stands up from the lower wall portion 252, and an outer wall portion 256 that continues to the lower wall portion 252 on the left, stands up from the lower wall portion 252, and is opposed to the inner wall portion 254 in the width direction. Further, from a viewpoint of surely causing the left side member 20 to exhibit the function as the crushable portion that is crushed and deformed in the front-rear direction by the impact applied to the front end of the subframe 1 and transmitted to the left side member 20 in frontal collision of the vehicle and the function as the bendable portion that is bent and deformed by that impact in the direction crossing the front-rear direction, it is preferable that the upper member 200 and the lower member 250 are arranged to form an overlapped portion in which a lower end of the inner wall portion 204 overlaps an upper end of the inner wall portion 254 and an overlapped portion in which a lower end of the outer wall portion 206 overlaps an upper end of the outer wall portion 256, and are integrated with each other by being welded by arc welding or the like at a lower end of each overlapped portion. Further, it is possible to suppress moisture or the like from entering into each overlapped portion from above. Furthermore, from a viewpoint of improving the shape accuracy of formation of the left side member 20 and surely causing the function as the crushable portion and the function as the bendable portion to be exhibited, it is preferable that the upper member 200 and the lower member 250 connect the upper wall portion 202 and the inner wall portion 204, the upper wall portion 202 and the outer wall portion 206, the lower wall portion 252 and the inner wall portion 254, and the lower wall portion 252 and the outer wall portion 256 with inclined wall portions S, respectively, in such a manner that a corner between these wall portions is chamfered.

A plurality of inclined wall portions S may be provided with different inclination angles between these wall portions. Further, in welding of the overlapped portion in which the lower end of the inner wall portion 204 overlaps the upper end of the inner wall portion 254 and the overlapped portion in which the lower end of the outer wall portion 206 overlaps the upper end of the outer wall portion 256, those overlapped portions themselves may be welded by plug welding or the like.

In the widened portion 21 of the upper member 200 of the left side member 20, a distance between the inner wall portion 204 and the outer wall portion 206 gradually increases toward the rear, so that the upper wall portion 202 is widened. In addition, a collar member 224 with a through hole 222 formed therein and a collar member 228 with a through hole 226 formed therein are arranged in the widened through portion 21 in such a manner that the through holes 222 and 226 are coaxial with a through hole (not shown) that penetrates through the widened portion 21 vertically. In the widened portion 21 of the lower member 250 of the left side member 20, a distance between the inner wall portion 254 and the outer wall portion 256 gradually increases toward the rear, so that the lower wall portion 252 is widened. In addition, in the widened portion 21, a through hole 272 and a through hole 276 are formed to be respectively coaxial with the through hole 222 of the collar member 224 and the through hole 226 of the collar member 228. The forefront of the widened portion 21 is a portion at which the width of the widened portion 21 starts to increase toward the rear (a widening-start portion), and is represented as an inner widening-start portion 210 on the right and an outer widening-start portion 212 on the left in FIGS. 1 to 3 and 5. The inner widening-start portion 210 and the outer widening-start portion 212 are portions on which stress concentrates the most because of the impact applied to the front end of the subframe 1 and transmitted to the left side member 20 in frontal collision of the vehicle, because the width of the widened portion 21 increases to the rear and the widened portion 21 is attached and restricted to a rear end of a left side frame of a vehicle body and a front lower portion of a cabin at the positions of the through holes 222, 226, 272, and 276 located on the rear side of the inner widening-start portion 210 and the outer widening-start portion 212. Therefore, at this time, the inner widening-start portion 210 and the outer widening-start portion 212 each function as the first fragile portion 22 that is a portion of start of crush deformation of the left side member 20 in the front-rear direction because of the front-rear direction component of the impact transmitted to the left side member 20. Further, in the first fragile portion 22, when the impact is transmitted to the left side member 20, the inner wall portion 204 and the inner wall portion 254 are deformed to become concave to the left and the outer wall portion 206 and the outer wall portion 256 are deformed to become concave to the right by the front-rear direction component of the transmitted impact. In association with this deformation, crush deformation in which the upper wall portion 202 is deformed to project upward and the lower wall portion 252 is deformed to project downward is caused to occur.

In the second fragile portion 23 that is adjacent to the first fragile portion 22 arranged to correspond to the inner widening-start portion 210 and the outer widening-start portion 212, and is located on the front side of the first fragile portion 22, the upper wall portion 202 is dented downward to have a predetermined dent depth (a length in the vertical direction) as compared with that in the general portion G in the upper member 200 and, in association with denting, an inclination angle of the inclined wall portion S between the upper wall portion 202 and the inner wall portion 204 and an inclination angle of the inclined wall portion S between the upper wall portion 202 and the outer wall portion 206 become gentle, as shown in FIG. 6. Also, the lower wall portion 252 is dented upward to have the same dent depth as the predetermined dent depth of the upper wall portion 202 as compared with that in the general portion G in the lower member 250 and, in association with denting, an inclination angle of the inclined wall portion S between the upper wall portion 202 and the inner wall portion 254 and an inclination angle of the inclined wall portion S between the upper wall portion 202 and the outer wall portion 256 become gentle. That is, in the second fragile portion 23, a distance between the upper wall portion 202 of the upper member 200 and the lower wall portion 252 of the lower member 250 (a distance in the vertical direction) is reduced equally on the upper and lower sides, as compared with that in the outer contour of the general portion G, so that the shape of the outer contour of the second fragile portion 23 forms a concave portion 214 and a concave portion 264, and the area of a longitudinal section of the left side member 20 taken along a plane parallel to an x-z plane is isotropically reduced in the vertical direction with respect to that of the general portion G. Because the concave portions 214 and 264 each have a longitudinal sectional shape that has the area isotropically reduced in the vertical direction, the concave portions 214 and 264 cause crush deformation that is induced by crush deformation of the left side member 20 started by the first fragile portion to occur continuously. When the impact is transmitted to the left side member 20, the front-rear direction component of the impact causes crush deformation to occur in which the upper wall portion 202 and the inclined wall portion S in the concave portion 214 are deformed to become concave downward and the lower wall portion 252 and the inclined wall portion S in the concave portion 264 are deformed to become concave upward and, in association with this deformation, the inner wall portion 204 and the inner wall portion 254 are deformed to project to the right and the outer wall portion 206 and the outer wall portion 256 are deformed to project to the left, following crush deformation of the first fragile portion 22. Further, when such crush deformation in which concave deformation and convex deformation are combined with each other occurs continuously, such crush deformation that is a combination of concave deformation and convex deformation further occurs in the left side member 20 on the front side of the second fragile portion 23 continuously.

In the third fragile portion 24 arranged on the front side of the second fragile portion 23, the upper wall portion 202 is dented downward to have a predetermined dent depth (a length in the vertical direction) as compared with that in the general portion G in the upper member 200, as shown in FIG. 7. In association with denting, an inclination angle of the inclined wall portion S between the upper wall portion 202 and the inner wall portion 204 and an inclination angle of the inclined wall portion S between the upper wall portion 202 and the outer wall portion 206 become gentle. However, the lower wall portion 252 is not dented upward in the third fragile portion 24, unlike the second fragile portion 23. That is, in the third fragile portion 24, a distance between the upper wall portion 202 of the upper member 200 and the lower wall portion 252 of the lower member 250 (a distance in the vertical direction) is reduced by denting the upper wall portion 202 only, as compared with that in the outer contour of the general portion G, so that the shape of the outer contour of the third fragile portion 24 forms a concave portion 216. The area of a longitudinal section of the left side member 20 taken along a plane parallel to an x-z plane is anisotropically reduced in the vertical direction with respect to that of the general portion G, and that area of the longitudinal section is arranged to be larger than the area of the longitudinal section of each of the first and second fragile portions 22 and 23. Because the concave portion 216 has a longitudinal sectional shape the area of which is anisotropically reduced in the vertical direction and is larger than that of each of the first and second fragile portions 22 and 23, bending deformation is caused to occur in which the upper wall portion 202 and the inclined wall portion S in the concave portion 216 are deformed to become concave downward and, in association with this deformation, the lower wall portion 252 and the inclined wall port ion S of the lower member 250 are deformed to project downward, after at least most of crush deformation of the left side member 20 is completed. The concave portion 216 can be provided in the inner wall portions 204 and 254 or the outer wall portions 206 and 256 of the upper and lower members 200 and 250 or in the lower member 250, not in the upper member 200, in accordance with a direction in which bending deformation of the left side member 20 is required.

Further, from a viewpoint of surely causing crush deformation of the left side member 20 to occur in a wide region, it is preferable that a distance in the front-rear direction between the second fragile portion 23 and the third fragile portion 24 is arranged to be longer than a distance in the front-rear direction between the first fragile portion 22 and the second fragile portion 23. Furthermore, the lower member 250 has a shape obtained by vertically inverting the shape of the upper member 200 with its width reduced by its plate thickness in the lateral direction from which the third fragile portion 24 is omitted. In addition, the upper wall portion 202, the lower wall portion 252, the inner wall portion 204, the inner wall portion 254, the outer wall portion 206, the outer wall portion 256, and the inclined wall portions S are flat wall portions except for the widened portion 21, the first fragile portion 22, the second fragile portion 23, and the third fragile portion 24.

In the left side member 20, through holes 230 and 232 and through holes 280 and 282 are formed typically between the second fragile portion 23 and the third fragile portion 24. The through holes 230 and 232 are formed in the upper wall portion 202 of the upper member 200 to penetrate therethrough vertically, and the through holes 280 and 282 are formed in the lower wall portion 252 of the lower member 250 to penetrate therethrough vertically to be coaxial with the through holes 230 and 232, respectively.

The configuration related to the right side member 30 is symmetrical with the configuration related to the left side member 20 with respect to a plane that is parallel to a y-z plane and passes through the center line extending in the front-rear direction in the center in the width direction of the vehicle body, and therefore the detailed descriptions thereof are omitted. The right side member 30 has a widened portion 31, a first fragile portion 32, a second fragile portion 33, a third fragile portion 34, an upper member 300, a lower member 350, an upper wall portion 302, a lower wall portion 352, inner wall portions 304 and 354, outer wall portions 306 and 356, inclined wall portions S, an inner widening-start portion 310, an outer widening-start portion 312, concave portions 314, 316, 364, and 366, through holes 322, 326, 330, 332, 372, 376, 380, and 382, and collar members 324 and 328 that respectively correspond to the widened portion 21, the first fragile portion 22, the second fragile portion 23, the third fragile portion 24, the upper member 200, the lower member 250, the upper wall portion 202, the lower wall portion 252, the inner wall portions 204 and 254, the outer wall portions 206 and 256, the inclined wall portions S, the inner widening-start portion 210, the outer widening-start portion 212, the concave portions 214, 216, 264, and 266, the through holes 222, 226, 230, 232, 272, 276, 280, and 282, and the collar members 224 and 228.

Among various portions at which the subframe 1 is attached to a vehicle body in the above configuration, the through hole 166 provided in the front member 162 of the left front attachment member 16 corresponds to the left-front first vehicle-body attachment portion A1, the through hole 176 provided in the front member 172 of the right front attachment member 17 corresponds to the right-front second vehicle-body attachment portion A2, the through hole 448 provided in the rear inner member 444 and the outer member 446 of the left intermediate attachment member 44 corresponds to the left-intermediate third vehicle-body attachment portion A3, the through hole 548 provided in the rear inner member 544 and the outer member 546 of the right intermediate attachment member 54 corresponds to the right-intermediate fourth vehicle-body attachment portion A4, the through holes 222, 226, 272, and 276 and the collar members 224 and 228 provided in the widened portion 21 of the left side member 20 correspond to the left-rear fifth vehicle-body attachment portion A5, and the through holes 322, 326, 372, and 376 and the collar members 324 and 328 provided in the widened portion 31 of the right side member 30 correspond to the right-rear sixth vehicle-body attachment portion A6. All these portions are typically portions used for fastening with a fastening member such as a bolt.

Further, an example is assumed in which a rigid structure without any subframe mounting member is employed for these portions. However, a floating structure using a subframe mounting member may be employed.

Among various portions in which the subframe 1 supports inner pivoting portions of a suspension arm, an opening defined by the front member 462 and the rear member 464 of the left front supporting member 46 and a through hole and the nut 466 provided therein correspond to the left-front first supporting portion S1, an opening defined by the front member 562 and the rear member 564 of the right front supporting member 56 and a through hole and the nut 566 provided therein correspond to the right-front second supporting portion 52, the through holes 230 and 232 provided in the upper wall portion 202 and the through hole 280 and 282 provided in the lower wall portion 252 of the left side member 20 correspond to the left-rear third supporting portion S3, and the through holes 330 and 332 provided in the upper wall portion 302 and the through hole 380 and 382 provided in the lower wall portion 352 of the right side member 30 correspond to the right-rear fourth supporting portion S4. All these portions are typically portions used for fastening with a fastening member such as a bolt. Further, an example is assumed in which an L-shaped lower arm is employed as the suspension arm applied to these portions.

However, an A-shaped lower arm or two I-shaped lower arms may be employed. Furthermore, regarding the left-front first supporting portion S1 and the right-front second supporting portion S2, an example is assumed in which an inner cylinder of an insulator bush member (not shown) is fastened thereto. Regarding the left-rear third supporting portion S3 and the right-rear fourth supporting portion S4, an example is assumed in which a bracket is fastened thereto and the insulator bush member is attached to those brackets, although illustrations thereof are omitted.

Among various attachment portions at which various external-force application parts are attached to the subframe 1, the through hole 112 provided in the upper wall portion 102 and the through hole 182 and the collar member 190 provided in/on the lower wall portion 152 in the left front portion 12 of the cross member 10 correspond to the steering-gear-box left attachment portion A7, and the through hole 114 provided in the upper wall portion 102 and the through hole 184 and the collar member 192 provided in/on the lower wall portion 152 in the right front portion 13 of the cross member 10 correspond to a steering-gear-box right attachment portion A8. All these portions are typically portions used for fastening with a fastening member such as a bolt.

Furthermore, the through hole 110 and the base member 120 provided in/on the upper wall portion 102 and the through hole 160 provided in the lower wall portion 152 in the lateral portion 11 of the cross member 10, and the brackets 64 and 68 and the through holes 62 and 66 provided on/in the front coupling member 60 correspond to the driving-source supporting portion M1 in which the subframe 1 supports a driving source. All these portions are typically portions used for fastening with a fastening member such as a bolt. In addition, the though hole 110 and the base member 120 provided in/on the upper wall portion 102 in the lateral portion 11 of the cross member 10, used as the driving-source supporting portion M1, may be also used as a steering-gear-box rear attachment portion.

In the subframe 1 according to the present embodiment described above includes the front member 10, 40, 50, 60 arranged on a front side in a front-rear direction in a vehicle body, allows a driving source that generates a driving force for driving a vehicle to be mounted thereon, and has a front attachment portion to be attached to both ends in a width direction of the vehicle body on the front side, and the first side member 2C and the second side member 30 that extend in the front-rear direction, are arranged to be opposed to each other in the width direction of the vehicle body, are each connected to the front member 10, 40, 50, 60, and each have a rear attachment portion to be attached to a portion on a rear side in the vehicle body in the front-rear direction. The first side member 20 and the second side member 30 each have a crushable portion (a section including the fragile portions 22, 23, the fragile portions 32, 33) in which crush deformation is caused to occur in the front-rear direction by a load applied thereto via the front member 10, 40, 50, 60 in frontal collision of the vehicle and a bendable portion (a section including the fragile portion 24, the fragile portion 34) in which bending deformation is caused to occur in a direction crossing the front-rear direction by the load, arranged in series.

Therefore, while the strength and the rigidity of the entire subframe 1 are improved, it is possible to transmit an impact applied typically in frontal collision of the vehicle to the first and second side members 20 and 30 at a time in a distributed manner via the front member 10, 40, 50, 60 that is more hardly deformed than the first and second side members, and combine crush deformation in which the amount of energy absorption in deformation is large and bending deformation in which the flexibility of deformation is high in the first and second side members 20 and 30 in which a stroke of crush deformation (the amount of deformation in a crush direction) can be easily made large and in which the flexibility of bending deformation can be easily arranged to be high, so that a required collision performance can be exhibited.

Further, in the subframe 1 according to the present embodiment, the first side member 20 and the second side member 30 each have fragile portions 22, 23, 24, 32, 33, 34 for the load in frontal collision. In each of the first side member 20 and the second side member 30, the rear attachment portion A5, A6 is arranged in the widened portion 21, 31 having a width that gradually increases in the width direction to the rear side, the crushable portion (the section including the fragile portions 22, 23, the fragile portions 32, 33) is arranged on the rear side of the bendable portion (the section including the fragile portion 24, the fragile portion 34), and crush deformation is able to start at a portion in the widened portion 21, 31 at which widening starts as the first fragile portion 22, 32 in the fragile portions 22, 23, 24, 32, 33, 34 for the load in frontal collision. Therefore, it is possible to surely cause crush deformation to start while portions of attaching the subframe 1 to the vehicle body are ensured and the crushable portion is ensured at the same time.

In the subframe 1 according to the present embodiment, in each of the first side member 20 and the second side member 30, a portion in the crushable portion (the section including the fragile portions 22, 23, the fragile portions 32, 33) is arranged as the second fragile portion 23, 33 in the fragile portions 22, 23, 24, 32, 33, 34, the portion being adjacent to the first fragile portion 22, 32 on the front side of the first fragile portion 22, 32 and having a sectional area of a longitudinal section of each of the first side member 20 and the second side member 30 taken along a plane perpendicular to the front-rear direction, which is obtained by reducing that of the general portion G other than the fragile portion 22, 23, 24, 32, 33, 34 and the widened portion 21, 31 on both sides in the vertical direction of the vehicle body. Also, in the bendable portion (the section including the fragile portion 24, the fragile portion 34), a portion is arranged as the third fragile portion 24, 34 in the fragile portions 22, 23, 24, 32, 33, 34, the portion having the sectional area of the longitudinal section of each of the first side member 20 and the second side member 30, which is obtained by reducing that of the general portion G on one side in the vertical direction. Therefore, crush deformation starting in the first fragile portion 22, 32 can be taken over by the second fragile portion 23, 33 and can be continued as continuous crush deformation, and bending deformation can be started in a state where crush deformation has been substantially completed.

In the subframe 1 according to the present embodiment, in each of the first side member 20 and the second side member 30, the supporting portion S3, S4 that supports a suspension member of the vehicle is arranged between the crushable portion (the section including the fragile portions 22, 23, the fragile portions 32, 33) and the bendable portion (the section including the fragile portion 24, the fragile portion 34). Therefore, while functions of crush deformation and bending deformation are surely exhibited, it is possible to support the suspension member at an appropriate supporting portion and to ensure the crushable portion (the section including the fragile portions 22, 23, the fragile portions 32, 33) and the bendable portion (the section including the fragile portion 24, the fragile portion 34) and the supporting portion S3, S4 that supports the suspension member at the same time.

In the subframe 1 according to the present embodiment, each of the first side member 20 and the second side member 30 includes the upper member 200, 300 having the pair of upper longitudinal (vertical) wall portions 204, 206, 304, 306 opposed to each other in the width direction and the upper wall portion 202, 302 connecting the pair of upper longitudinal wall portions 204, 206, 304, 306 to each other, and the lower member 250, 350 arranged below the upper member 200, 300 in the vertical direction of the vehicle body and having the pair of lower longitudinal (vertical) wall portions 254, 256, 354, 356 opposed to each other in the width direction and the lower wall portion 252, 352 connecting the pair of lower longitudinal wall portions 254, 256, 354, 356 to each other. The pair of upper longitudinal wall portions 204, 206, 304, 306 and the pair of lower longitudinal wall portions 254, 256, 354, 356 are welded to each other in overlapped portions thereof to correspond to each other. Therefore, it is possible to appropriately weld each of the first side member 20 and the second side member 30 while the functions of crush deformation and bending deformation are exhibited.

In the subframe 1 according to the present embodiment, the upper member 200, 300 has the upper inclined wall portions S between the pair of upper longitudinal wall portions 204, 206, 304, 306 and the upper wall portion 202, 302 to connect them to each other, and the lower member 250, 350 has the lower inclined wall portions S between the pair of lower longitudinal wall portions 254, 256, 354, 356 and the lower wall portion 252, 352 to connect them to each other. Therefore, it is possible to improve the shape accuracy of each of the first side member 20 and the second side member 30 after formation and to allow the functions of crush deformation and bending deformation to be exhibited surely.

In the present invention, the types, shapes, arrangements, numbers, and the like of the constituent members are not limited to those in the above embodiment, and it is needless to mention that the constituent elements can be modified as appropriate without departing from the scope of the invention, such as appropriately replacing these constituent elements with other members having equivalent operational effects.

As described above, in the present invention, it is possible to provide a vehicle subframe capable of exhibiting a required collision performance by combining crush deformation in which the amount of energy absorption in deformation is large and bending deformation in which the flexibility of deformation is high with each other, while improving the strength and the rigidity. Therefore, because of its general purposes and universal characteristics, applications of the present invention can be expected in a wide range in the field of a subframe of a moving body such as a vehicle.

What is claimed is:

1. A vehicle subframe attached to a vehicle body of a vehicle, comprising:
   a front member that is arranged on a front side in a front-rear direction in the vehicle body, allows a driving source that generates a driving force for driving the vehicle to be mounted thereon, and has a front attachment portion to be attached at both ends in a width direction of the vehicle body on the front side; and
   a first side member and a second side member that extend in the front-rear direction, are arranged to be opposed to each other in the width direction of the vehicle body, are each connected to the front member, and each have a rear attachment portion to be attached to a portion on a rear side in the vehicle body in the front-rear direction,
   wherein the first side member and the second side member each have a crushable portion in which crush deformation is caused to occur in the front-rear direction by a load applied thereto via the front member in frontal collision of the vehicle, and a bendable portion in which bending deformation is caused to occur in a direction crossing the front-rear direction by the load, arranged in series.

2. The vehicle subframe according to claim 1, wherein the first side member and the second side member each have fragile portions for the load,
   in each of the first side member and the second side member, the rear attachment portion is arranged in a widened portion having a width that gradually increases in the width direction to the rear side, and
   the crushable portion is arranged on the rear side of the bendable portion, and the crush deformation is able to start at a portion of the widened portion at which widening of the width starts, as a first fragile portion in the fragile portions for the load.

3. The vehicle subframe according to claim 2, wherein in each of the first side member and the second side member, a portion in the crushable portion is arranged as a second fragile portion in the fragile portions, the portion being adjacent to the first fragile portion on the front side of the first fragile portion and having a sectional area of a longitudinal section of each of the first side member and the second side member taken along a plane perpendicular to the front-rear direction, which is obtained by reducing that of a general portion other than the fragile portions and the widened portion on both sides in a vertical direction of the vehicle body, and a portion in the bendable portion is arranged as a third fragile portion in the fragile portions, the portion having the sectional area of the longitudinal section of each of the first side member and the second side member, which is obtained by reducing that of the general portion on one side in the vertical direction.

4. The vehicle subframe according to claim 3, wherein in each of the first side member and the second side member, a supporting portion that supports a suspension member of the vehicle is arranged between the crushable portion and the bendable portion.

5. The vehicle subframe according to claim 1, wherein each of the first side member and the second side member includes an upper member that has a pair of upper longitudinal wall portions opposed to each other in the width direction and an upper wall portion connecting the pair of upper longitudinal wall portions to each other, and a lower member that is arranged below the upper member in a vertical direction of the vehicle body and has a pair of lower longitudinal wall portions opposed to each other in the width direction and a lower wall portion connecting the pair of lower longitudinal wall portions to each other, and the pair of upper longitudinal wall portions and the pair of lower longitudinal wall portions are welded in overlapped portions thereof to correspond to each other.

6. The vehicle subframe according to claim 5, wherein the upper member includes upper inclined wall portions between the pair of upper longitudinal wall portions and the upper wall portion to connect the pair of upper longitudinal wall portions and the upper wall portion to each other, and the lower member includes lower inclined wall portions between the pair of lower longitudinal wall portions and the lower wall portion to connect the pair of lower longitudinal wall portions and the lower wall portion to each other.

* * * * *